United States Patent [19]

Huys

[11] Patent Number: 4,861,961
[45] Date of Patent: Aug. 29, 1989

[54] WELDING ELECTRODE

[76] Inventor: John H. Huys, R.R. #3, Tottenham, Ontario, Canada

[21] Appl. No.: 752,566

[22] Filed: Jul. 8, 1985

Related U.S. Application Data

[63] Continuation-in-part of Ser. No. 240,516, Mar. 4, 1981, abandoned, which is a continuation-in-part of Ser. No. 36,906, May 7, 1979.

[51] Int. Cl.$^4$ .............................................. B23K 35/22
[52] U.S. Cl. ........................................ 219/119; 219/84
[58] Field of Search ............................. 219/119, 120, 84

[56] References Cited

U.S. PATENT DOCUMENTS

| | | | |
|---|---|---|---|
| 1,176,614 | 3/1916 | Stanley | 219/119 |
| 2,431,334 | 11/1947 | Lambert | 219/119 |
| 2,629,803 | 2/1953 | Bondley | 219/119 |
| 3,215,811 | 11/1965 | Kroy et al. | 219/120 |
| 3,354,290 | 11/1967 | Monroe et al. | 219/120 |
| 3,478,189 | 11/1969 | Estes | 219/84 |
| 3,989,923 | 11/1976 | Lees et al. | 219/119 X |

FOREIGN PATENT DOCUMENTS

| | | | |
|---|---|---|---|
| 1125866 | 6/1982 | Canada | 219/119 |
| 2804816 | 8/1979 | Fed. Rep. of Germany | 219/119 |
| 2424093 | 12/1979 | France | 219/119 |

Primary Examiner—Clifford C. Shaw
Attorney, Agent, or Firm—Diller, Ramik & Wight

[57] ABSTRACT

Electrodes for use in electric resistance welding and a method of making such electrodes are disclosed. The electrodes are each shaped to define a tip surface for contact with a workpiece during welding. In one embodiment, each electrode comprises an electrode body of copper and a layer of titanium carbide on the body defining said tip surface. The titanium carbide layer is fused to the electrode body by a spark-fusion technique and forms a unitary electrode with the body. This form of electrode has been found advantageous in terms of minimizing "pick-up" of workpiece material during welding, and distortion of the electrode.

11 Claims, No Drawings

WELDING ELECTRODE

This application is a continuation-in-part of application Ser. No. 240,516, filed Mar. 4, 1981 now abandoned, which application was a continuation-in-part of application Ser. No. 036,906 filed May 7, 1979.

This invention relates to electrodes for use in electric resistance welding.

Resistance welding techniques are widely used in industry, e.g. for spot welding in the assembly of car bodies. In that particular application, a welding gun fitted with a pair of electrodes is moved in steps along a weld path. At each step, the electrodes are closed onto opposite sides of the workpieces to be welded and an electric current is passed between the electrodes. Due to the electrical resistance presented by the interface between the workpieces, localized heating takes place and causes the workpieces to fuse locally. The electrodes are then removed from the workpieces. To prevent the electrodes from softening, cooling water is continuously circulated through them. On a production line basis, these steps are performed in rapid sequence and are repeated at each weld location.

Conventional electrodes used for resistance welding are made of copper or berylium, for low electrical resistance and high current flow between the electrodes. However, major problems have been found to occur with these electrodes in practice. Amongst these, the electrodes tend to "pick-up" or stick to the workpieces with the result that sparking and weld separation takes place as the electrodes are removed. Distortion or "mushrooming" of the electrodes is also a problem.

The following is a list of prior art references which were considered in the preparation of this specification.

U.S. Pat. Nos.:

1,176,614 (Stanley);
2,431,334 (Lambert);
3,215,811 (Kroy et al.);
3,989,923 (Lees et al.)
West German Offenlegungsschrift No. 28 04 816
French Patent No. 2,424,093

An object of the present invention is to provide an improved electric resistance welding electrode. Another object is to provide an improved method of manufacturing such an electrode.

According to one aspect of the invention, there is provided an electric resistance welding electrode shaped to define a tip surface for contact with a workpiece during welding and comprising a electrode body of a first material having a relatively low electrical resistivity, and a layer 1 of a second material on the body defining said tip surface. The second material has a relatively high electrical resistivity and a degree of high temperature hardness and compressive strength selected to minimize electrode distortion in use and comprising at least 90% pure titanium. The second material is fused to the electrode body so as to form a unitary electrode therewith.

The second material layer may be of a thickness in the range of one to five thousandth of an inch.

According to a further aspect of the invention, the tip surface on the electrode may be defined by a layer of titanium carbide of a thickness in the approximate range one to five thousandth of an inch.

According to a still further of the invention, the electrode body may be made of copper and the tip surface defined by a layer of titanium carbide fused to the electrode body by spark fusion.

The invention also provides a method of manufacturing an electric resistance welding electrode. The method includes the steps of providing an electrode body which is of a material having a relatively low electrical resistivity and which is shaped to define a surface at which the electrode is to contact a workpiece in use. A layer of a second material having a relatively high electrical resistivity and a degree of high-temperature hardness and compressive strength selected to minimize electrode distortion in use is fused to said electrode body surface b:

(a) providing a probe of said second material;
(b) causing said probe to vibrate against said electrode body surface while passing an electric current between said probe and electrode body at a level sufficient to cause said second material to be fused into said electrode body surface; and
(c) traversing the vibrating probe across said electrode body surface until a layer of said second material has been fused into said surface.

In order that the invention may be more clearly understood, reference will now be made to the accompanying drawings which illustrate a number of embodiments of the invention by way example and in which:

FIG. 1 a perspective view of a spot welding electrode according to one embodiment of the invention;

FIG. 2 is an elevational view showing two such electrodes in use a spot weld between two workpieces;

FIG. 3 is an elevational view similar to FIG. 2, but showing wheel-type electrodes for forming a seam weld according to a further embodiment of the invention;

FIG. 4 is a diagrammatic vertical sectional view through an electrode as that shown in FIG. 1; and, FIG. 5 is a diagrammatic illustration of the method by which an electrode according to the invention may be manufactured.

Referring first to FIG. 1, a spot welding electrode is generally indicated 10 and is shaped to define a tip surface 12 for contact with a workpiece during welding. The electrode is made up of an electrode body 14 of copper and a layer 16 of titanium carbide on the body which defines the tip surface 12. Layer 16 is fused to body 14 to form a unitary electrode therewith. In this particular embodiment, the electrode body 14 is of a shape including a frusto-conical tip portion 18, the outer end of which is the tip surface 12, a generally cylindrical center portion 20 at the base of tip portion 18, and a stem portion 22 of somewhat narrower cylindrical shape. A bore 24 is provided in body 14 and extends through the stem portion 22 and into the tip portion 18 for permitting cooling water to be circulated through the tip for preventing softening of the electrode in use.

FIG. 2 shows two electrodes of the form shown in FIG. 1 in use during the performance of a spot welding operation. The two electrodes are generally indicated at 10' and 10" and have tip surfaces 12' and 12" defined by titanium carbide layers 16', 16" respectively. Two workpieces 26 and 28 are shown positioned between the electrodes for forming a spot weld therebetween. The electrodes will be mounted in a suitable spot welding gun, but the gun has not been shown in FIG. 2 because it is entirely conventional.

In the performance of a spot welding operation, the electrodes 10 and 10' are closed onto opposite sides of the workpieces under pressure and an electric current is caused to flow between the electrodes in manner known per se. The electrical resistance to current flow presented by the interface between the workpieces 26 and 28 causes localized heating of the workpieces causing them to fuse together. After a predetermined time interval, also known per se, the electrodes are separated from the workpieces. Cooling water is continuously circulated through the electrodes to prevent softening thereof. The electrodes are then moved to the next weld location and the operation is repeated.

In practical tests using electrodes of the form shown in FIG. 1 it has been found that the titanium carbide layer at the tip of each electrode prevents pick-up of material from the workpieces. Sparking, particularly with galvanized workpieces was almost completely eliminated in most cases and in some cases was even eliminated completely. The life of the electrodes was also increased substantially compared with prior art electrodes in that the electrodes of the invention were found to be much more resistant to mushrooming or other distortion. As a result of these features, the quality of the welds was improved substantially. A further unexpected factor was that the welding gun was found to operate satisfactorily at a rate of power consumption some 20 to 30% lower than that required for satisfactory operation using conventional copper electrodes.

Reference will now be made to FIG. 3 which shows electrodes according to the invention in the form of welding wheels used for forming continuous seam welds. Two such wheels are shown and are denoted 30 and 32 respectively. The wheels are rotated about parallel axes and each wheel has a continuous peripheral tip surface for contact with a workpiece during welding. The tip surfaces of the two wheels are denoted respectively 34 and 36. A suitable source of electric current (not shown) is connected across the wheels in manner known per se and the wheels are spaced to define therebetween a gap which is narrower than the combined thicknesses of the workpieces to be welded.

In FIG. 3, two workpieces are indicated at 38 and 40 and are of a combined thickness T which is greater than the spacing S between the peripheries of the two welding wheels The workpieces are drawn through the nip between the welding wheels in the direction of arrow 42. The fact that the wheels are spaced closer together than the thickness of the workpieces develops the necessary pressure between the electrodes and the workpieces to form a continuous weld nugget 44 between the workpieces.

Each welding wheel comprises a copper electrode body and the tip surface of the wheel is made of titanium carbide material fused to the electrode body so as to form a unitary electrode therewith.

In practice, the results which have been achieved with the welding wheels have indicated that benefits may be realized similar to those achieved with spot welding electrodes, namely substantial reduction in pick-up, longer electrode life, improved weld quality and electric power savings.

Conventional approaches to the design of the electric resistance welding electrodes have indicated that the electrode should be made of a material having a low electrical resistivity so as to minimize the electrical resistance offered by the electrodes themselves and obtain maximum current flow. Accordingly, the present invention goes directly against conventional thinking in the art in that the titanium carbide layer at the tip surface of the electrode has a relatively high electrical resistivity. Rather than impairing welding efficiency, it has surprisingly been found that this high resistance is advantageous. It is believed that the presence of this electrically resistive layer at the tip surface of the electrode assists in rapid heat build-up at the point of contact between the electrode and the workpiece, leading to improved welding efficiency. While the effect on the welding operation of the titanium carbide layer is not fully understood, it is believed that the material may also in effect for a thermal barrier (due to its low thermal conductivity) inhibiting heat from being conducted away from the workpiece to the cooled electrode body. Further, since the titanium carbide retains much of its hardness and compressive strength at the elevated welding temperatures encountered, it can withstand a substantial heat build-up which occurs in that layer without physical distortion like mushrooming.

The prior art has taught to avoid electrode materials of high resistivity. Inevitably, pick-up and sticking problems arise due to the high temperatures at the electrode-workpiece interface. However, a material of such high resistivity as titanium carbide actually proves effective in reducing pick-up and sticking. Unlike other materials of high electrical resistivity such as tungsten carbide, titanium carbide forms a relatively stable oxide layer which is not susceptible to rupture under the temperature and pressure conditions encountered in resistance welding.

Further, it is believed that it may be possible to take advantage of the advantageous features of titanium carbide by otpimizing various design features of the electrodes themselves. For example, in the case of a spot welding electrode, it is possible that the tip diameter may be decreased compared with prior art electrodes, which will enable high current densities and pressures to be used with less workpiece distortion. As a result of the smaller tip diameter, it may also be possible to reduce the current duration, saving power and further reducing distortion.

It should also be noted that, while specific reference has been made herein to an electrode body made of copper and a titanium carbide tip surface, other materials may be used. The electrode body should be made of a material having a relatively low electrical resistivity. Beryllium is an example of another material which may be suitable for the electrode body. The material at the tip surface of the electrode should have a relatively high electrical resistivity and a degree of hardness and compressive strength selected to minimize adhesion between the material and the workpiece during welding. In the particular examples referred to above, the titanium carbide used was of the type having a nickel matrix as a binder. However, it is to be understood that other binder materials such as cobalt may be used.

Specifically, tests have indicated that K165 (a Kennametal (TM) grade of titanium carbide) and Amcar Metals SR-810, grade R-03 are eminently suitable tip compositions. However, other titanium carbide compositions may of course be used.

It has also been found that pure titanium metal may be used for forming the tip surface. Thus, tests have shown that tip material comprising at least 90% pure titanium may advantageously be used for forming the tip surface.

The thickness of the tip surface layer has also been found to be important. If the layer is too thin, i electrode distortion and pick-up will occur, while if the layer is too thick, the tip material will present too high a resistance to current flow during welding with the result that the electrode may melt when a current adequate to form a proper weld is used. Practical experiments have shown that a thickness in the approximate range of one to five thousandth of an inch is appropriate in the case of a titanium carbide tip layer on a copper electrode body.

FIG. 4 of the drawings is a diagrammatic vertical sectional view through an electrode of the type shown in FIG. 1 and corresponding reference numerals have been used in FIG. 4. The thickness T of the tip layer 16 should be in the range one to five thousandth of an inch and it should be noted that this measurement refers to the actual thickness of layer 16. Thus, if the overall height H of the electrode is measured after layer 16 has been applied and is compared with the corresponding height of the electrode body before layer 16 was applied, an accurate measurement of the thickness of layer 16 may not be achieved because it has been found in practice that application of this titanium carbide layer will cause the end of the electrode body to "collapse" somewhat so that there may in effect be some reduction in overall height of the electrode body.

The electrode body may be manufactured by any of the conventional techniques employed for manufacturing such components. The titanium carbide layer can be subsequently fused to the electrode body by a number of techniques, for example, by a spark-fusion technique such as that disclosed in U.S. Pat. No. 3,416,970 (Cline). In a modified form of that device as shown diagrammatically in FIG. 5 of the drawings, a vibrating "probe" of titanium carbide can be used to impregnate the surface of the electrode body with titanium carbide by applying the probe to the body while passing an electric current between the electrode and the probe. The speed of vibration of the probe can be controlled in infinitely variable manner to appropriately control the deposition of titanium carbide. Similarly, the current used can also be controlled for optimum results.

In FIG. 5, a copper electrode body such as that referred to in connection with FIG. 1 is indicated at 14 and has a surface 14a intended for contact with a workpiece when the finalized electrode is in use, and to which a layer forming a tip surface is to be applied. Reference numeral 50 indicates a device of the general type shown in the Cline patent referred to above fitted with a probe 52 of titanium carbide. The device is used to cause the probe 52 to vibrate against electrode body surface 14a and is adapted to rotate the probe rapidly about its longitudinal axis. Device 52 is electrically powered and its power supply incorporates an infinitely variable speed controller 54 by which the speed of rotation of the probe can be varied in an infinite manner. In an alternative embodiment, the device may be adapted to cause probe 52 to rapidly oscillate back and forth in the axial direction so that the outer end of the probe can repeatedly impinge against surface 42 instead of rotating. In any event, a DC power supply indicated at 56 is connected at one side to the electrode body 14 and at the other side to the probe 52 by way of a slip ring (not shown) in device 50. Device 50 is designed to be hand held and can be manipulated to bring probe 52 in contact with the electrode body 14 so that the probe will vibrate against the body while an electric current passed between the probe and the body by way of power supply 56. The level of current is controlled so as to cause the material of probe 52 to be fused into the electrode body surface 15. The device is manipulated to cause the vibrating probe to traverse across the surface 14a until a layer of the appropriate depth has been fused into surface 14a. In practice, the speed of vibration of probe 52 and the current level are adjusted and balanced against one another until satisfactory fusion conditions are achieved without undue damage to the electrode body.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An electric resistance welding electrode shaped to define a tip surface for contact with a workpiece during welding and comprising an electrode body of a first material having a relatively low electrical resistivity, and a layer of a second material on said body defining said tip surface, said second material having a relatively high electrical resistivity and a degree of high-temperature hardness and comprehensive strength selected to minimize electrode distortion in use, and comprising at least 90% pure titanium, said second material being fused to the electrode body so as to form a unitary electrode therewith, and said layer of said second material having a thickness in the approximate range 1 to 5 thousandths of an inch.

2. An electric resistance welding electrode shaped to define a tip surface for contact with a workpiece during welding and comprising an electrode body of a material having a relatively low electrical resistivity, and a layer of titanium carbide on said body defining said tip surface, said titanium carbide layer being of a thickness in the approximate range of 1 to 5 thousandths of an inch and being fused to the electrode body to form a unitary electrode therewith.

3. An electrode as claimed in claim 1 or 2, wherein said electrode body is made of copper.

4. An electric resistance welding electrode shaped to define a tip surface for contact with a workpiece during welding and comprising an electrode body of copper, and a layer of titanium carbide on said body defining said tip surface, said titanium carbide layer being fused to the electrode body by spark fusion so as to form a unitary electrode with said body and having a thickness in the range 1 to 5 thousandths of an inch.

5. An electrode as claimed in claim 2 or 4, wherein said electrode body is of a shape including a frustoconical tip portion having an outer end on which said layer of titanium carbide is disposed, a generally cylindrical centre portion at the base of said tip portion, a stem portion of somewhat narrower cylindrical shape and a bore extending through said stem portion into said tip portion.

6. An electrode as claimed in claim 1, 2 or 4, wherein said electrode comprises a welding wheel, and wherein said tip surface extends continuously along the periphery of said wheel.

7. A method of manufacturing an electric resistance welding electrode comprising the steps of:
providing an electrode body which is of a material having a relatively low electrical resistivity and which is shaped to define a surface intended for contact with a workpiece in use;
fusing to said surface a layer of a second material having a relatively high electrical resistivity, by:
(a) providing a probe of said second material;

(b) causing said probe to vibrate against said electrode body surface while passing an electric current between said probe and body at a level sufficient to cause material to be fused into said electrode body surface; and (c) traversing the vibrating probe across said electrode body surface until a layer of said material has been fused into said surface.

8. A method as claimed in claim 7, wherein said step of traversing the vibrating probe is performed until said layer of said second material is of a depth in the range of approximately 1 to 5 thousandths of an inch.

9. A method as claimed in claim 7 or 8, wherein said second material comprises at least 95% by weight of titanium metal.

10. A method as claimed in claim 7, wherein said second material is titanium carbide.

11. A method as claimed in claim 7, wherein said step of causing the probe to vibrate against the electrode body surface is effected by rotating said probe.

* * * * *